Patented Feb. 7, 1939

2,146,474

UNITED STATES PATENT OFFICE 2,146,474

PREPARATION OF β-(P-HYDROXYPHENYL)-ISOPROPYLMETHYLAMINE

Gustav Hildebrandt, Mannheim, Germany, assignor to E. Bilhuber Inc., Jersey City, N. J.

No Drawing. Application May 24, 1937, Serial No. 144,546. In Germany May 26, 1936

4 Claims. (Cl. 260—574)

The present invention relates to an improved process for the preparation of β-(p-hydroxyphenyl)-isopropylmethylamine.

It has already been proposed to prepare β-(p-methoxyphenyl)-isopropylmethylamine by treating p-methoxybenzylmethyl ketone with reagents which yield formic acid and methylamine. The formyl compound of β-(p-methoxyphenyl)-isopropylmethylamine is produced and is saponified with dilute mineral acids. According to another proposal β-(p-hydroxyphenyl)-isopropylmethylamine may be obtained from β-(p-methoxyphenyl)-isopropylmethylamine by eliminating the methoxy group with strong acids.

The applicant has carried out this known process and ascertained that by boiling p-methoxybenzylmethyl ketone with sodium formate and methylamine hydrochloride in the presence of formic acid and saponifying the resulting formyl compound with dilute mineral acids β-(p-methoxyphenyl)-isopropylmethylamine can at best be obtained in a yield of 40%. If methylamine formate is used instead of methylamine hydrochloride and sodium formate the yield of β-(p-methoxyphenyl)-isopropylmethylamine is increased to 53%. By eliminating the methoxy group from the resulting β-(p-methoxyphenyl)-isopropylmethylamine by heating the latter with strong acids the β-(p-hydroxyphenyl)-isopropylmethylamine can be obtained in yields from 36% up to 48%.

According to this invention it has been found that β-(p-hydroxyphenyl)-isopropylmethylamine can be prepared in a substantially more simple manner and in considerably better yields, by starting from p-hydroxybenzylmethyl ketone, condensing this with methylamine and thereafter or simultaneously reducing the product of condensation.

The β-(p-hydroxyphenyl)-isopropylmethylamine can in this way be prepared in one operation and in yields of more than 90%, whereas according to the known processes at least three operations are necessary. The process of this invention also enables formic acid to be dispensed with, which owing to its corrosive action on almost all technical materials constitutes an undesirable reaction component.

Examples 1. 80 gms. of p-hydroxybenzylmethyl ketone, 40 gms. of activated aluminium turnings, 400 ccs. of alcohol and 40 ccs. of 40% aqueous methylamine solution are mixed together and the mixture is stirred for 7 hours on a boiling water bath. The mixture is filtered, the alcohol distilled off from the solution and the residue taken up in dilute hydrochloric acid and extracted with ether. The acid solution is precipitated with ammonia whereby β-(p-hydroxyphenyl)-isopropylmethylamine is obtained in good yield.

2. 30 gms. of p-hydroxybenzylmethyl ketone, 350 ccs. of 85% alcohol, 30 gms. of activated aluminium turnings and 40 ccs. of 40% aqueous methylamine solution are refluxed for 16 hours. After separating from aluminium sludge and washing with alcohol, the solution is acidified with hydrochloric acid and evaporated to dryness and the residue is dissolved in a small quantity of water and the solution precipitated with potassium carbonate solution. The precipitate is separated by suctional filtration and washed with a small quantity of water. Yield: 30.6 gms. of base of melting point 162° C.=93% of theory.

3. 30 gms. of p-hydroxybenzylmethyl ketone, 40 gms. of 40% aqueous methylamine solution, 30 gms. of nickel catalyst and 30 ccs. of methyl alcohol are stirred for 3 hours at 80° C. and 25 atmospheres with hydrogen in a stirring autoclave. After separating the catalyst the same procedure is followed as described in Example 2. Yield: 30.7 gms. of base=93% of theory.

What I claim is:

1. A process for the preparation of β-(p-hydroxyphenyl)-isopropylmethylamine, which consists in condensing p-hydroxybenzylmethyl ketone with methylamine and reducing the condensation product at the nitrogen atom to form the corresponding saturated amine.

2. A process according to claim 1, wherein the condensation with methylamine and the reduction of the condensation product are effected simultaneously.

3. A process according to claim 1, wherein the condensation of the ketone with methylamine and the reduction of the condensation product are effected consecutively.

4. A process for the preparation of β-(p-hydroxyphenyl)-isopropylmethylamine, which consists in condensing p-hydroxybenzylmethyl ketone with methylamine and hydrogenating the condensation product at the nitrogen atom to form a saturated amine.

GUSTAV HILDEBRANDT.